US011225201B2

(12) United States Patent
Moulin

(10) Patent No.: US 11,225,201 B2
(45) Date of Patent: Jan. 18, 2022

(54) TRACK ASSEMBLY

(71) Applicant: Lear Corporation, Southfield, MI (US)

(72) Inventor: Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 27 days.

(21) Appl. No.: 16/215,127

(22) Filed: Dec. 10, 2018

(65) Prior Publication Data

US 2020/0180517 A1    Jun. 11, 2020

(51) Int. Cl.
*B60P 7/08*  (2006.01)
*B60R 11/00* (2006.01)
*F16M 13/02* (2006.01)

(52) U.S. Cl.
CPC ............. *B60R 11/00* (2013.01); *F16M 13/02* (2013.01); *B60P 7/08* (2013.01); *B60R 2011/0084* (2013.01); *F16M 2200/027* (2013.01)

(58) Field of Classification Search
USPC .... 248/499, 500, 503, 503.1, 505, 506, 510, 248/229.2, 229.23, 229.24, 229.14, 248/229.13, 429, 229.22, 229.25, 229.26; 410/96, 101, 104, 105, 106, 116
See application file for complete search history.

(56) References Cited

U.S. PATENT DOCUMENTS

| | | | |
|---|---|---|---|
| 2,126,143 A | 8/1938 | McGregor | |
| 2,263,554 A * | 11/1941 | Brach | H01Q 1/084 343/715 |
| 2,480,622 A | 8/1949 | Warnock | |
| 2,678,082 A | 5/1954 | Nathan | |
| 3,181,102 A | 4/1965 | Fehr | |
| 3,213,403 A | 10/1965 | Hermann | |
| 3,268,848 A | 8/1966 | Adams | |
| 3,940,182 A | 2/1976 | Tamura | |

(Continued)

FOREIGN PATENT DOCUMENTS

| | | |
|---|---|---|
| CN | 1212739 A | 3/1999 |
| CN | 103241146 A | 8/2013 |

(Continued)

OTHER PUBLICATIONS

Copending U.S. Appl. No. 16/215,090, filed Dec. 10, 2019.

(Continued)

*Primary Examiner* — Alfred J Wujciak
(74) *Attorney, Agent, or Firm* — Fishman Stewart PLLC

(57) ABSTRACT

A support assembly includes a first support member, a second support member, and/or a rod. The first support member and/or the second support member may be connected via the rod. The first support member and/or the second support member may be configured to move longitudinally along the rod. The first support member and/or the second support member may be configured to rotate about the rod. The first support member and/or the second support member may be configured to selectively engage a track. The first support member may include a first contact member and/or a third contact member. The second support member may include a second contact member and/or a fourth contact member. The first contact member may be configured to move with the third contact member, and/or the second contact member may be configured to move with the fourth contact member.

20 Claims, 6 Drawing Sheets

(56) References Cited

U.S. PATENT DOCUMENTS

| | | | |
|---|---|---|---|
| 4,020,769 A | | 5/1977 | Keir |
| 4,198,025 A | | 4/1980 | Lowe et al. |
| 4,243,248 A | | 1/1981 | Scholz et al. |
| 4,282,631 A | | 8/1981 | Uehara et al. |
| 4,365,744 A | | 12/1982 | Moehren |
| 4,500,020 A | | 2/1985 | Rasor |
| 4,511,187 A | | 4/1985 | Rees |
| 4,575,295 A | | 3/1986 | Rebentisch |
| 4,618,808 A | | 10/1986 | Ish-Shalom et al. |
| 4,707,030 A | | 11/1987 | Harding |
| 4,711,589 A | | 12/1987 | Goodbred |
| 4,776,809 A | | 10/1988 | Hall |
| 4,830,531 A | | 5/1989 | Condit et al. |
| 4,961,559 A | | 10/1990 | Raymor |
| 4,969,621 A | | 11/1990 | Munchow et al. |
| 4,987,316 A | | 1/1991 | White et al. |
| 5,137,331 A | | 8/1992 | Colozza |
| 5,167,393 A | | 12/1992 | Hayakawa et al. |
| 5,192,045 A | | 3/1993 | Yamada et al. |
| 5,222,814 A | | 6/1993 | Boelryk |
| 5,322,982 A | | 6/1994 | Leger et al. |
| 5,332,290 A | | 7/1994 | Borlinghaus et al. |
| 5,348,373 A | | 9/1994 | Stiennon |
| 5,446,442 A | | 8/1995 | Swart et al. |
| 5,466,892 A | | 11/1995 | Howard et al. |
| 5,489,172 A | | 2/1996 | Michler |
| 5,489,173 A | | 2/1996 | Hofle |
| 5,582,381 A | | 12/1996 | Graf et al. |
| 5,599,086 A | | 2/1997 | Dutta |
| 5,618,192 A | | 4/1997 | Drury |
| 5,655,816 A | | 8/1997 | Magnuson et al. |
| 5,676,341 A | | 10/1997 | Tarusawa et al. |
| 5,696,409 A | | 12/1997 | Handman et al. |
| 5,701,037 A | | 12/1997 | Weber et al. |
| 5,796,177 A | | 8/1998 | Werbelow et al. |
| 5,800,015 A | | 9/1998 | Tsuchiya et al. |
| 5,899,532 A | | 5/1999 | Paisley et al. |
| 5,918,847 A | | 7/1999 | Couasnon |
| 5,921,606 A | | 7/1999 | Moradell et al. |
| 5,964,442 A | | 10/1999 | Wingblad et al. |
| 5,964,815 A | | 10/1999 | Wallace et al. |
| 6,036,157 A | | 3/2000 | Baroin et al. |
| 6,138,921 A | | 10/2000 | Espinosa |
| 6,142,718 A | | 11/2000 | Kroll |
| 6,150,774 A | | 11/2000 | Mueller et al. |
| 6,166,451 A | | 12/2000 | Pigott |
| 6,216,995 B1 | | 4/2001 | Koester |
| 6,227,595 B1 | | 5/2001 | Hamelin et al. |
| 6,299,230 B1 | | 10/2001 | Oettl |
| 6,318,802 B1 | | 11/2001 | Sjostrom et al. |
| 6,357,814 B1 | | 3/2002 | Boisset et al. |
| 6,400,259 B1 | | 6/2002 | Bourcart et al. |
| 6,405,988 B1 | | 6/2002 | Taylor et al. |
| 6,422,596 B1 | | 7/2002 | Fendt et al. |
| 6,439,531 B1 | | 8/2002 | Severini et al. |
| 6,480,144 B1 | | 11/2002 | Miller et al. |
| 6,536,982 B2 * | | 3/2003 | Gibbons ............ F16B 7/0433 403/391 |
| 6,693,368 B2 | | 2/2004 | Schumann et al. |
| 6,710,470 B2 | | 3/2004 | Bauer et al. |
| 6,719,350 B2 | | 4/2004 | Duchateau et al. |
| 6,736,458 B2 | | 5/2004 | Chabanne et al. |
| 6,772,056 B2 | | 8/2004 | Mattes et al. |
| 6,805,375 B2 | | 10/2004 | Enders et al. |
| 6,851,708 B2 | | 2/2005 | Kazmierczak |
| 6,882,162 B2 | | 4/2005 | Schirmer et al. |
| 6,960,993 B2 | | 11/2005 | Mattes et al. |
| 7,042,342 B2 | | 5/2006 | Luo et al. |
| 7,113,541 B1 | | 9/2006 | Lys et al. |
| 7,159,899 B2 | | 1/2007 | Nitschke et al. |
| 7,170,192 B2 | | 1/2007 | Kazmierczak |
| 7,207,541 B2 | | 4/2007 | Frohnhaus et al. |
| 7,271,501 B2 | | 9/2007 | Dukart et al. |
| 7,293,831 B2 | | 11/2007 | Greene |
| 7,300,091 B2 | | 11/2007 | Nihonmatsu et al. |
| 7,322,605 B2 | | 1/2008 | Ventura et al. |
| 7,348,687 B2 | | 3/2008 | Aichriedler et al. |
| 7,363,194 B2 | | 4/2008 | Schlick et al. |
| 7,388,466 B2 | | 6/2008 | Ghabra et al. |
| 7,416,042 B2 | | 8/2008 | Czaykowska et al. |
| 7,434,883 B2 | | 10/2008 | Deptolla |
| 7,454,170 B2 | | 11/2008 | Goossens et al. |
| 7,455,535 B2 | | 11/2008 | Insalaco et al. |
| 7,505,754 B2 | | 3/2009 | Kazmierczak et al. |
| 7,523,913 B2 | | 4/2009 | Mizuno et al. |
| 7,556,233 B2 | | 7/2009 | Gryp et al. |
| 7,560,827 B2 | | 7/2009 | Jacas-Miret et al. |
| 7,633,301 B2 | | 12/2009 | Steenwyk et al. |
| 7,661,637 B2 | | 2/2010 | Mejuhas et al. |
| 7,665,939 B1 | | 2/2010 | Cardona |
| 7,739,820 B2 * | | 6/2010 | Frank .................. G09F 3/204 40/647 |
| 7,744,386 B1 | | 6/2010 | Speidel et al. |
| 7,980,525 B2 | | 7/2011 | Kostin |
| 7,980,798 B1 | | 7/2011 | Kuehn et al. |
| 8,010,255 B2 | | 8/2011 | Darraba |
| 8,146,991 B2 | | 4/2012 | Stanz et al. |
| 8,278,840 B2 | | 10/2012 | Logiudice et al. |
| 8,282,326 B2 | | 10/2012 | Krostue et al. |
| 8,376,675 B2 | | 2/2013 | Schulze et al. |
| 8,463,501 B2 | | 6/2013 | Jousse |
| 8,536,928 B1 | | 9/2013 | Gagne et al. |
| 8,648,613 B2 | | 2/2014 | Ewerhart et al. |
| 8,702,170 B2 | | 4/2014 | Abraham et al. |
| 8,757,720 B2 | | 6/2014 | Hurst, III et al. |
| 8,800,949 B2 | | 8/2014 | Schebaum et al. |
| 8,857,778 B2 | | 10/2014 | Nonomiya |
| 8,936,526 B2 | | 1/2015 | Boutouil et al. |
| 8,967,719 B2 | | 3/2015 | Ngiau et al. |
| RE45,456 E | | 4/2015 | Sinclair et al. |
| 9,010,712 B2 | | 4/2015 | Gray et al. |
| 9,018,869 B2 | | 4/2015 | Yuasa et al. |
| 9,045,061 B2 | | 6/2015 | Kostin et al. |
| 9,162,590 B2 | | 10/2015 | Nagura et al. |
| 9,174,604 B2 | | 11/2015 | Wellhoefer et al. |
| 9,242,580 B2 | | 1/2016 | Schebaum et al. |
| 9,318,922 B2 | | 4/2016 | Hall et al. |
| 9,340,125 B2 | | 5/2016 | Stutika et al. |
| 9,346,428 B2 | | 5/2016 | Bortolin |
| 9,422,058 B2 | | 8/2016 | Fischer et al. |
| 9,561,770 B2 | | 2/2017 | Sievers et al. |
| 9,610,862 B2 | | 4/2017 | Bonk et al. |
| 9,663,232 B1 | | 5/2017 | Porter et al. |
| 9,673,583 B2 | | 6/2017 | Hudson et al. |
| 9,701,217 B2 | | 7/2017 | Eckenroth et al. |
| 9,731,628 B1 | | 8/2017 | Rao et al. |
| 9,758,061 B2 | | 9/2017 | Pluta et al. |
| 9,789,834 B2 | | 10/2017 | Rapp et al. |
| 9,796,304 B2 | | 10/2017 | Salter et al. |
| 9,815,425 B2 | | 11/2017 | Rao et al. |
| 9,821,681 B2 | | 11/2017 | Rao et al. |
| 9,840,220 B2 | | 12/2017 | Van Buskirk et al. |
| 9,919,624 B2 | | 3/2018 | Cziomer et al. |
| 9,950,682 B1 | | 4/2018 | Gramenos et al. |
| 10,059,232 B2 | | 8/2018 | Frye et al. |
| 10,160,351 B2 | | 12/2018 | Sugimoto et al. |
| 10,308,145 B2 | | 6/2019 | Cziomer et al. |
| 10,479,227 B2 | | 11/2019 | Nolte et al. |
| 10,493,243 B1 * | | 12/2019 | Braham .................. F16B 2/10 |
| 10,549,659 B2 | | 2/2020 | Sullivan et al. |
| 10,654,378 B2 | | 5/2020 | Pons |
| 2005/0046367 A1 | | 3/2005 | Wevers et al. |
| 2005/0089367 A1 * | | 4/2005 | Sempliner ............ F16B 2/185 403/381 |
| 2005/0150705 A1 | | 7/2005 | Vincent et al. |
| 2005/0211835 A1 | | 9/2005 | Henley et al. |
| 2005/0215098 A1 | | 9/2005 | Muramatsu et al. |
| 2005/0230543 A1 | | 10/2005 | Laib et al. |
| 2005/0258676 A1 | | 11/2005 | Mitchell et al. |
| 2006/0131470 A1 | | 6/2006 | Tamada et al. |
| 2006/0208549 A1 | | 9/2006 | Hancock et al. |
| 2006/0220411 A1 | | 10/2006 | Pathak et al. |
| 2006/0263163 A1 | | 11/2006 | Harberts et al. |
| 2008/0021602 A1 | | 1/2008 | Kingham et al. |

(56) References Cited

U.S. PATENT DOCUMENTS

| | | |
|---|---|---|
| 2008/0084085 A1 | 4/2008 | Mizuno et al. |
| 2008/0090432 A1 | 4/2008 | Patterson et al. |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2013/0037585 A1 | 2/2013 | Hubbard et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1 | 8/2015 | Davidson, Jr. et al. |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1* | 1/2018 | Wegner ............... F16L 3/2431 |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1* | 12/2019 | Christensen ........ F16L 3/1075 |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0194948 A1 | 6/2020 | Lammers et al. |
| 2020/0207241 A1 | 7/2020 | Moulin et al. |
| 2020/0262367 A1 | 8/2020 | Fernandez Banares et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |

FOREIGN PATENT DOCUMENTS

| | | |
|---|---|---|
| CN | 203190203 U | 9/2013 |
| CN | 203625728 U | 6/2014 |
| CN | 203799201 U | 8/2014 |
| CN | 206287857 U | 6/2017 |
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 202007003695 U1 | 6/2007 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |
| WO | 2013007980 | 1/2013 |

OTHER PUBLICATIONS

Co-Pending U.S. Appl. No. 16/597,187, filed Oct. 9, 2019.
Co-Pending U.S. Appl. No. 16/672,989, filed Nov. 4, 2019.
Co-Pending U.S. Appl. No. 16/711,661, filed Dec. 12, 2019.
Translation of Office Action obtained from Espacenet Global Dossier for corresponding Chinese Application 2019112191799, dated Mar. 22, 2021.

* cited by examiner

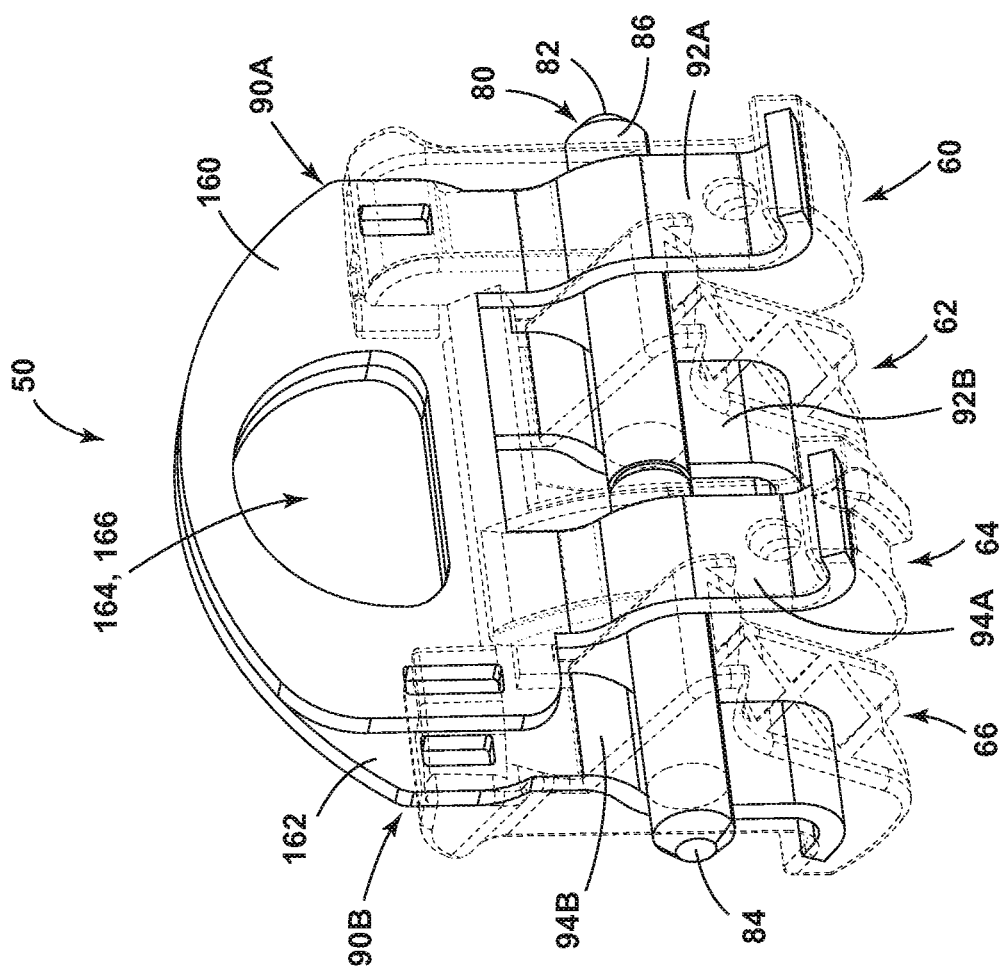
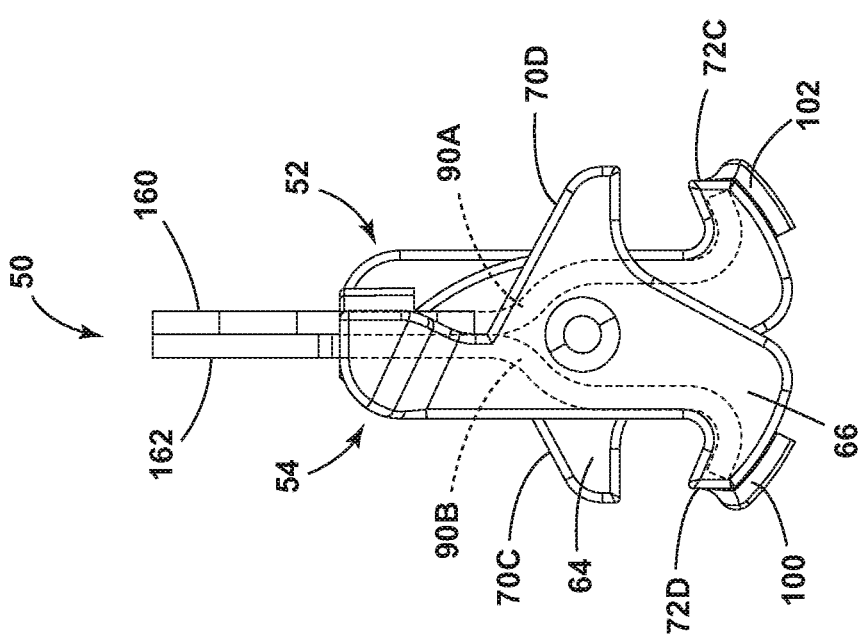
FIG. 5B
FIG. 5A

TRACK ASSEMBLY

TECHNICAL FIELD

The present disclosure generally relates to track assemblies that may include support assemblies, including track assemblies and support assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some track assemblies may be relatively complex and/or may not provide sufficient functionality. Some support assemblies may not be configured to be selectively removable from a track.

There is a desire for solutions/options that minimize or eliminate one or more challenges or shortcomings of support assemblies. The foregoing discussion is intended only to illustrate examples of the present field and should not be taken as a disavowal of scope.

SUMMARY

In embodiments, a support assembly may include a first support member, a second support member, and/or a rod. The first support member and/or the second support member may be connected via the rod. The first support member and/or the second support member may be configured to slide longitudinally along the rod. The first support member and/or the second support member may be configured to rotate about the rod. The first support member and/or the second support member may be configured to selectively engage a track. The first support member may include a first contact member and/or a third contact member. The second support member may include a second contact member and/or a fourth contact member. The first contact member may be configured to move with the third contact member, and/or the second contact member may be configured to move with the fourth contact member.

With embodiments, the first contact member and/or the third contact member may be configured to contact a first side of said track. The second contact member and/or the fourth contact member may be configured to contact a second side of said track. The first contact member, the second contact member, the third contact member, and/or the fourth contact member may be substantially S-shaped. The first contact member may include an upper portion and/or a lower portion. The upper portion may be configured to contact a top surface of a second side of said track, and/or the lower portion may be configured to contact an inner surface of a first side of said track. The second contact member may include a first fin and/or the third contact member may include a second fin. The first fin and/or the second fin may be configured to engage said track to limit longitudinal movement of the support assembly. The first support member and the second support member may include substantially the same configuration.

In embodiments, the first support member and/or the second support member may be configured to move between a first position and/or a second position. Removal of the first support member and/or the second support member from said track may not be substantially restricted when the first support member and/or the second support member are in the first position. Removal of the first support member and/or the second support member from said track may be restricted when the first support member and/or the second support member are in the second position. The support assembly may include a biasing member that may be configured to bias the first support member and/or the second support member toward the first position. The first support member may include a first latch and/or a first aperture. The second support member may include a second latch and/or a second aperture. When the first support member and/or the second support member may be in the second position, the first latch may be engaged with the second aperture and/or the second latch may be engaged with the first aperture. The first latch, the second latch, the first aperture, and/or the second aperture are configured to limit rotation of the first support member and the second support member.

With embodiments, the first support member may include a first latch, and/or the second support member includes a second latch. When the first support member and/or the second support member are in the first position, the first latch and/or the second latch may not be engaged with ends of the rod. When the first support member and the second support member are in the second position, the first latch and the second latch engage ends of the rod to limit longitudinal movement of the first support member and the second support member.

In embodiments, a track assembly may include a support assembly and/or a track. The support assembly may include a first support member, a second support member, and/or a rod. The track may include an outer track and/or an inner track. The inner track may be disposed at least partially in the outer track. The first support member and/or the second support member may be connected via the rod and/or may be configured to selectively engage the track. At least one of the first support member and/or the second support member may be configured to translate along the rod and/or rotate about the rod. An upper portion of a first contact member of the first support member and/or an upper portion of a second contact member of the second support member are configured to contact respective outer surfaces of the outer track when the support assembly is engaged with the track. A lower portion of the first contact member and/or a lower portion of the second contact member may be configured to contact respective inner surfaces of the outer track when the support assembly is engaged with the track.

With embodiments, the lower portion of the first contact member and/or the lower portion of the second contact member may each include a fin. The fins may be configured to engage the inner track and/or limit longitudinal movement of the first support member and/or the second support member relative to the track. The first support member and/or the second support member may include corresponding apertures that may, when the first support member and/or the second support member are in a clamped position, be substantially aligned and/or configured for attaching a connector. The first support member and/or the second support member may be configured to move between a first position and/or a second position. The first support member and/or the second support member may not be engaged with the track in the first position. The first support member and/or the second support member may be clamped with the track in the second position.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 5A is a side view of an embodiment of a support assembly according to teachings of the present disclosure.

FIG. 5B is a perspective view of an embodiment of a support assembly according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 2:
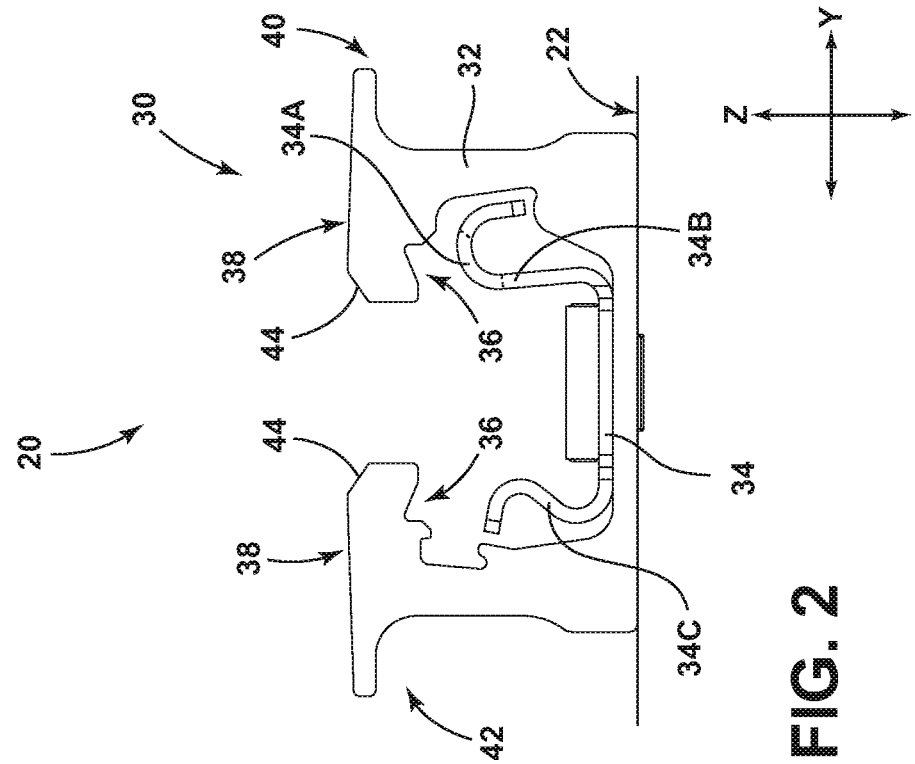
FIG. 2 is a side view of an embodiment of a track according to teachings of the present disclosure.
Figure 1:
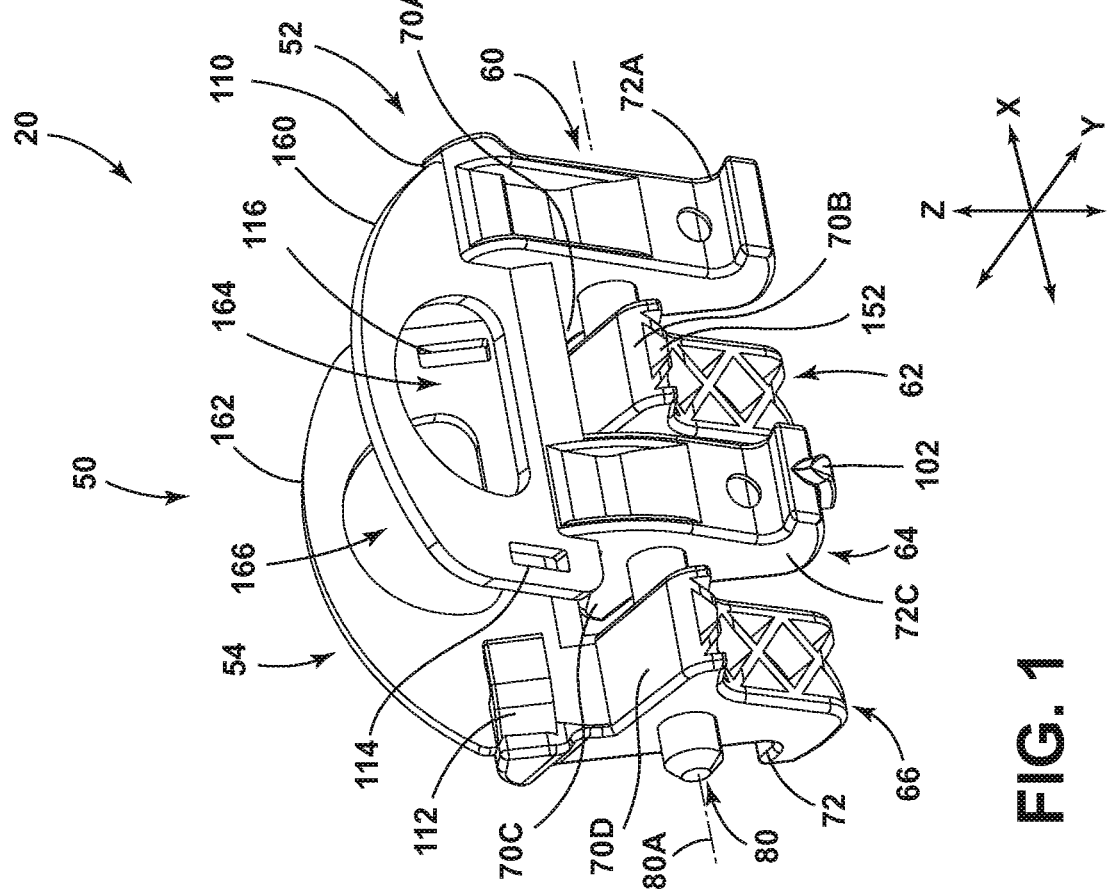
FIG. 1 is a perspective view of an embodiment of a support assembly according to teachings of the present disclosure.

In embodiments, such as generally illustrated in FIGS. 1 and 2, a track assembly 20 may include a support assembly 50 and/or a track 30. The support assembly 50 may be configured to selectively engage the track 30. The track assembly 20 may be connected to one or more of a variety of mounting surfaces 22, such as, for example and without limitation, a vehicle. The track assembly 20 may include an outer track 32 and/or an inner track 34. The inner track 34 may be at least partially disposed within the outer track 32. The outer track 32 may include an inner surface 36 and/or an outer surface 38. The outer track 32 may include a ramped portion 44 that may be disposed on the first side 40 and/or the second side 42 of the track 30. The ramped portion 44 may connect the inner surface 36 of the outer track 32 to the outer surface 38 of the outer track 32. The ramped portion 44 may include an angle (e.g., about 45 degrees, or more or less) with respect to the Y-direction and/or the Z-direction.

With embodiments, the support assembly 50 may include a first support member 52 and/or a second support member 54. The first support member 52 and/or the second support member 54 may be rotatably connected to each other via a rod 80. The rod 80 may be disposed substantially in a middle of the support assembly 50. The first support member 52 and the second support member 54 may rotate about an axis 80A of the rod 80 that may be substantially aligned with an X-direction (e.g., a longitudinal direction of the track assembly 20). The first support member 52 and/or the second support member 54 may move/slide longitudinally/axially along the rod 80. The first support member 52 and the second support member 54 may be configured to engage each other by moving along the rod 80.

Figure 4:
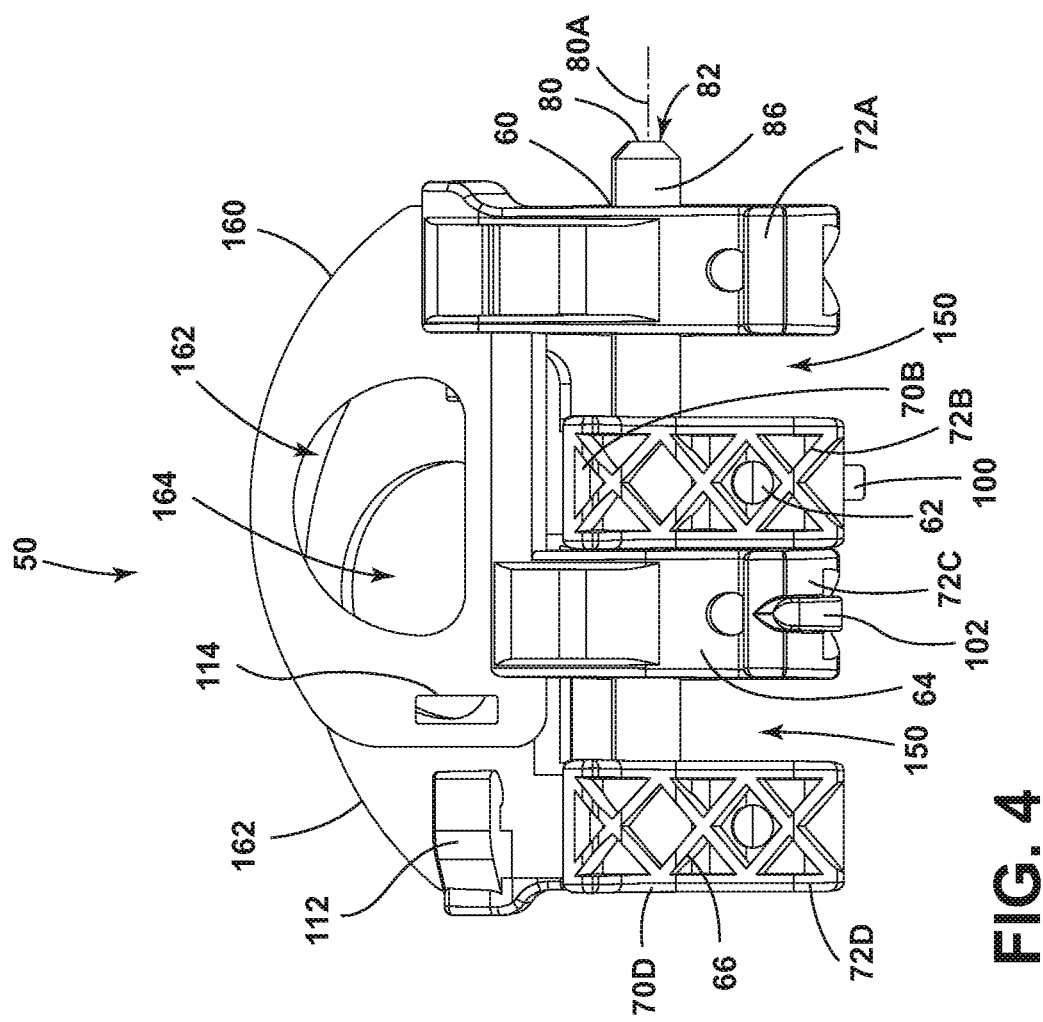
FIG. 4 is a perspective view of an embodiment of a support assembly according to teachings of the present disclosure.
Figure 3:
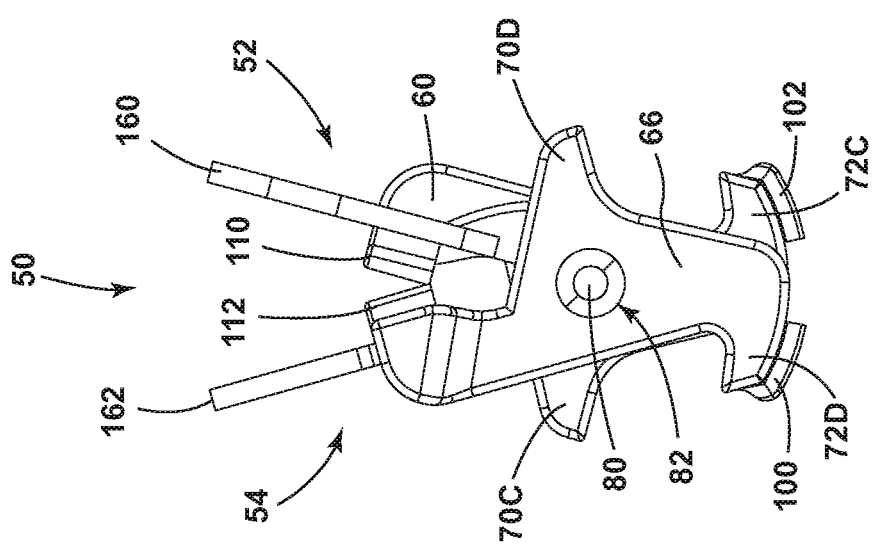
FIG. 3 is a side view of an embodiment of a support assembly according to teachings of the present disclosure.

With embodiments, such as generally illustrated in FIGS. 3 and 4, the first support member 52 may include a first contact member 60 and/or a third contact member 64. The second support member 54 may include a second contact member 62 and/or a fourth contact member 66. The second contact member 62 may be disposed at least partially between (e.g., in a longitudinal direction) the first contact member 60 and the third contact member 64. The third contact member 64 may be disposed at least partially between (e.g., in a longitudinal direction) the second contact member 62 and the fourth contact member 66. For example and without limitation, the contact members 60, 62, 64, 66 may be disposed in an alternating configuration. The first contact member 60 and the third contact member 64 may rotate in substantially the same manner. The second contact member 62 and the fourth contact member 66 may rotate in substantially the same manner.

The contact members 60, 62, 64, 66 may include one or more of a variety of shapes, sizes, and/or configurations. For example and without limitation, the contact members 60, 62, 64, 66 may be substantially S-shaped and/or curved (see, e.g., FIG. 3). In embodiments, the contact members 60, 62, 64, 66 may each include an upper portion 70A, 70B, 70C, 70D and/or a lower portion 72A, 72B, 72C, 72D. The upper portions 70A, 70B, 70C, 70D may be laterally offset (e.g., in a Y-direction) and/or vertically offset (e.g., in a Z-direction) from the lower portions 72A, 72B, 72C, 72D. The upper portion 70A, 70B, 70C, 70D of a contact member 60, 62, 64, 66 may extend in an opposite direction from and may be configured to contact an opposite side of the track 30 than the lower portion 72A, 72B, 72C, 72D of the same contact member 60, 62, 64, 66.

Figure 6A:
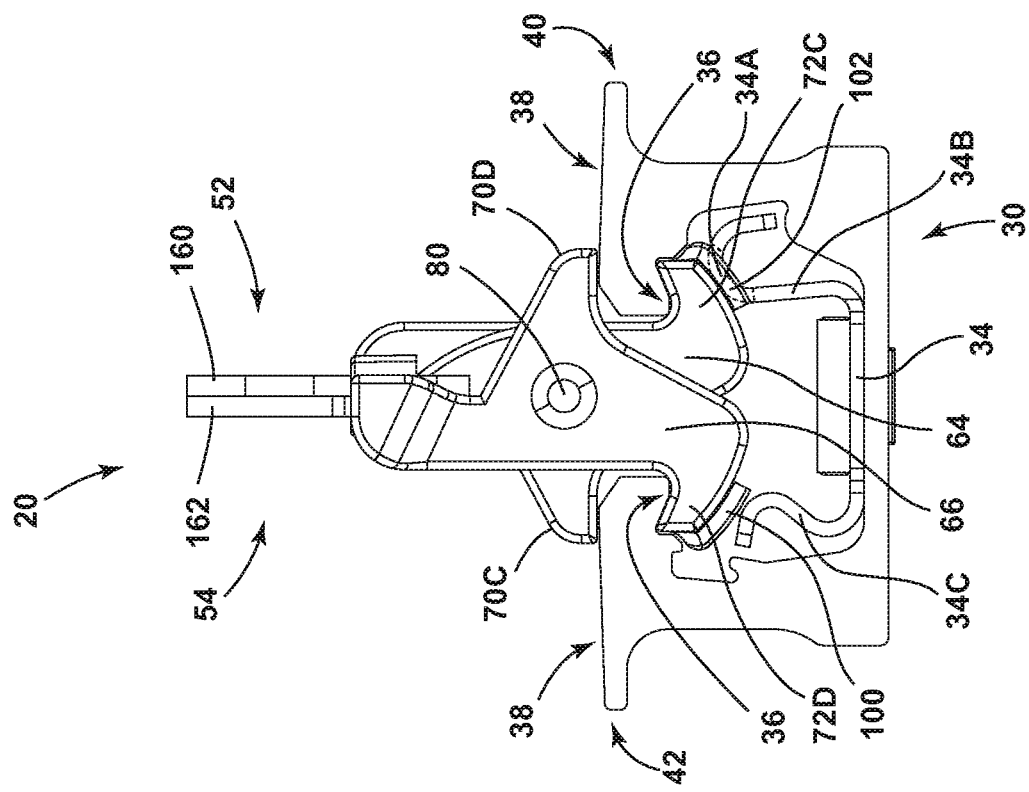
FIG. 6A is a side view of an embodiment of a track assembly, with a support assembly in a first position, according to teachings of the present disclosure.
Figure 6B:
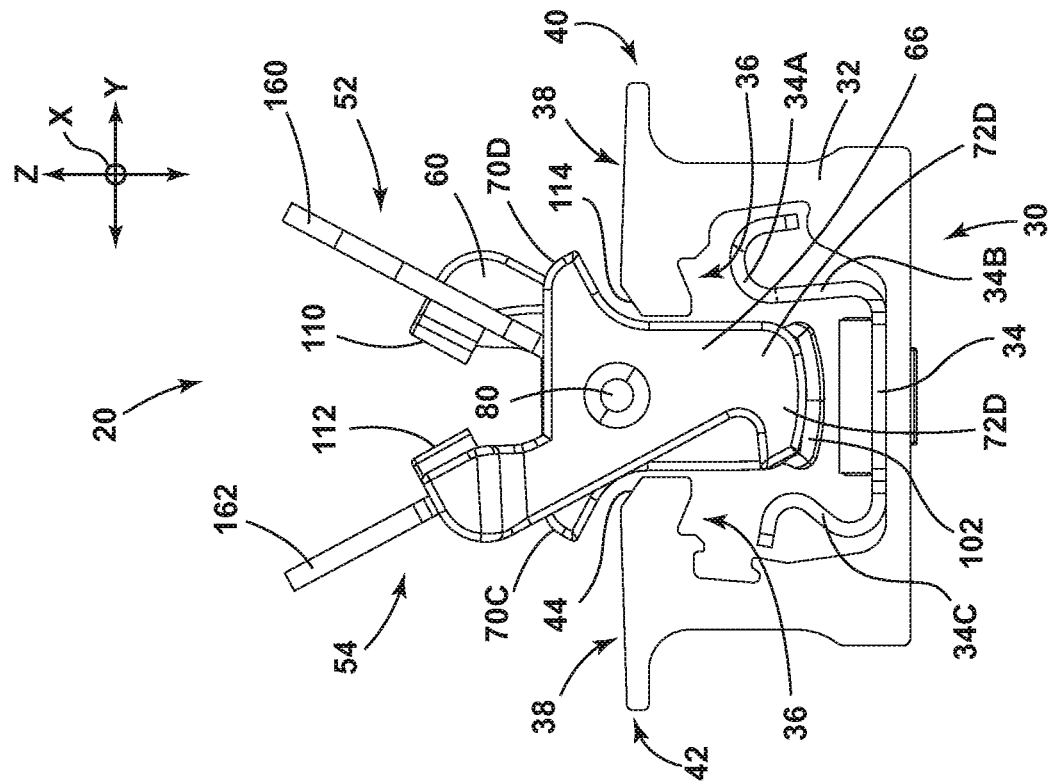
FIG. 6B is a side view of an embodiment of a track assembly, with a support assembly in a second position, according to teachings of the present disclosure.
Figure 6C:
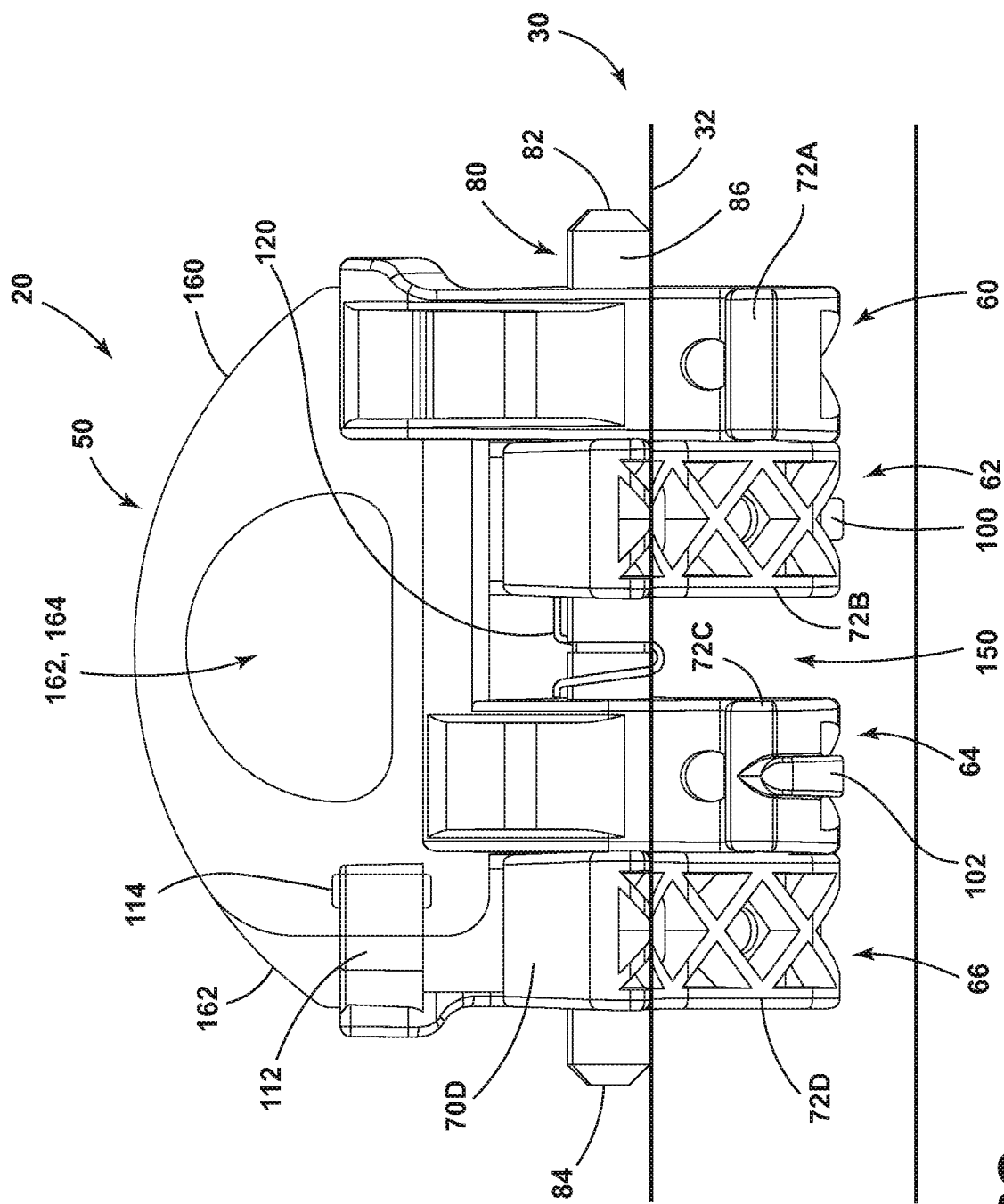
FIG. 6C is a side view of an embodiment of a track assembly, with a support assembly in a second position, according to teachings of the present disclosure.

In embodiments, such as generally illustrated in FIGS. 6A, 6B, and 6C, the contact members 60, 62, 64, 66 may be configured to contact at least a portion of the outer track 32 and/or the inner track 34. The upper portions 70A, 70B, 70C, 70D may contact an outer surface 38 of the outer track 32, and/or the lower portions 72A, 72B, 72C, 72D may contact an inner surface 36 of the outer track 32. For example and without limitation, the upper portions 70A, 70C of the first contact member 60 and/or the third contact member 64 may be configured to contact a second side 42 of the outer track 32. The lower portions 72A, 72C of the first contact member 60 and/or the third contact member 64 may be configured to contact a first side 40 of the outer track 32. The upper portions 70B, 70D of the second contact member 62 and/or the fourth contact member 66 may be configured to contact a first side 40 of the outer track 32. The lower portions 72B, 72D of the second contact member 62 and/or the fourth contact member 66 may be configured to contact a second side 42 of the outer track 32.

In embodiments, such as generally illustrated in FIGS. 5A and 5B, a support member 52, 54 may include a support portion 90A, 90B that may be disposed at least partially inside of the contact members 60, 62, 64, 66. The support portions 90A, 90B may provide structural support/strength to the support members 52, 54, respectively. For example and without limitation, the support portions 90A, 90B may include a relatively strong material (e.g., metal) and/or the contact members 60, 62, 64, 66 may include material that is not as strong (e.g., a plastic/polymer). The support portions 90A, 90B may not directly contact the track 30. The contact member 60, 62, 64, 66 may be configured to contact the track 30 instead of the support portions 90A, 90B. The support portions 90A, 90B may extend beyond (e.g., generally in an upward Z-direction) the contact members 60, 62, 64, 66. The contact members 60, 62, 64, 66 may be formed around the support portions 90A, 90B.

With embodiments, such as generally illustrated in FIGS. 5A and 5B, the support portions 90A, 90B may include a first section 92A, 92B and/or a second section 94A, 94B. The first sections 92A, 92B may be disposed at least partially in the first contact member 60 and the second contact member 62, respectively, and/or the second sections 94A, 94B may be disposed at least partially in the third contact member 64 and the fourth contact member 66 respectively. The first sections 92A, 92B may extend into and/or include generally the same shape as the lower portions 72A, 72B of the first contact member 60 and the second contact member 62. The second sections 94A, 94B may extend into and/or include generally the same shape as the lower portions 72C, 72D of the third contact member 64 and the fourth contact member 66.

With embodiments, one or more contact members 60, 62, 64, 66 may include a fin (e.g., fins 100, 102). For example, as generally illustrated in FIGS. 3, 4, and 6B, the second contact member 62 may include a first fin 100, and/or the third contact member 64 may include a second fin 102. The fins 100, 102 may include one or more of a variety of shapes, sizes, and/or configurations. For example, the fins 100, 102 may be rounded and/or elongated. The fins 100, 102 may extend from a middle of the bottom portion 72B of the second contact member 62 and/or the bottom portion 72C of the third contact member 64. The fins 100, 102 may be configured to selectively engage at least a portion of the track 30. For example and without limitation, the fins 100, 102 may be configured to contact/engage the inner track 34. The inner track 34 may include a plurality of recesses and/or apertures 34A that the fins 100, 102 may at least partially engage. When at least one fin 100, 102 is disposed at least partially in a recess/aperture 34A, the at least one fin 100, 102 may limit movement of the support assembly 50 in at least one direction (e.g., a longitudinal direction).

With embodiments, the inner track 34 may include a first portion/wall 34B and a second portion/wall 34C. The first portion/wall 34B may be taller (e.g., in the Z-direction) than the second portion/wall 34C. The one or more apertures 34A may be disposed in the first portion/wall 34B. If the support assembly 50 is connected to the track 30 in a first direction (see, e.g., FIG. 6B), the fin 102 of the third contact member 64 may selectively engage the one or more apertures 34A and/or the fin 100 of the second contact member 62 may not engage the second portion/wall 34C of the inner track 34. If the support assembly 50 is connected to the track 30 in a second direction, the fin 100 of the second contact member 62 may selectively engage the one or more apertures 34A and/or the fin 102 of the third contact member 64 may not engage the second portion/wall 34C of the inner track 34.

In embodiments, such as generally illustrated in FIGS. 3 and 4, the first support member 52 and/or the second support member 54 may include at least one latch 110, 112 and/or at least one aperture/recess 114, 116. The first support member 52 may include a first aperture/recess 114. The second support member 54 may include a second aperture/recess 116. The first latch 110 may be configured to at least partially engage the second recess 116, and/or the second latch 112 may be configured to at least partially engage the first recess 114. The first support member 52 and the second support member 54 may be connected and/or locked via the latches 110, 112 and recesses 114, 116.

With embodiments, the first support member 52 may connect to the second support member 54, such as via the first support member 52 and/or the second support member 54 moving longitudinally along the rod 80 towards each other. The first support member 52 and/or the second support member 54 may rotate about the rod 80 toward each other (see, e.g., FIGS. 6A, 6B, and 6C). The latches 110, 112 may limit relative movement of the first support member 52 and the second support member 54 in at least one direction. For example and without limitation, the latches 110, 112 may limit relative rotational and translational movement of the first support member 52 and/or the second support member 54.

Figure 7B:
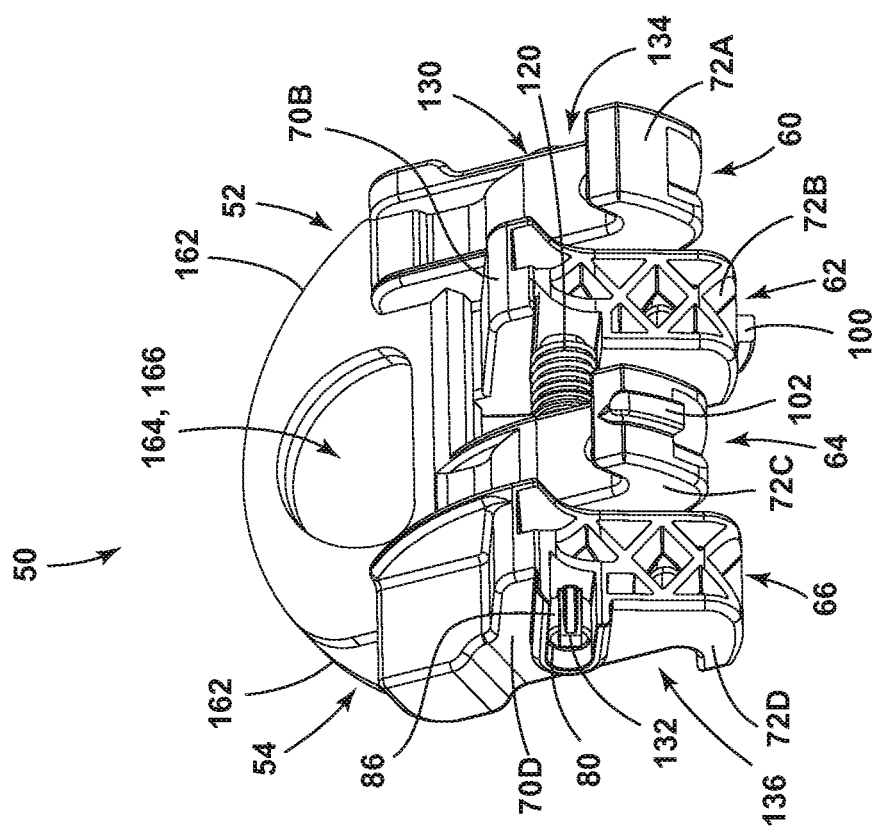
FIG. 7B is a perspective view of an embodiment of a support assembly according to teachings of the present disclosure.

In embodiments, such as generally illustrated in FIGS. 6C and 7B, the support assembly 50 may include a biasing member 120 that may be connected to the rod 80, the first support member 52, and/or the second support member 54. The biasing member 120 may, for example and without limitation, include a spring. The biasing member 120 may bias the first support member 52 and/or the second support member 54 toward a first position. The biasing member 120 may resist movement of the first support member 52 and/or the second support member 54 toward a second/clamped position. The biasing member 120 may bias the latches 110, 112 into the recesses 114, 116, when the first support member 52 and the second support member 54 are longitudinally aligned.

Figure 7A:
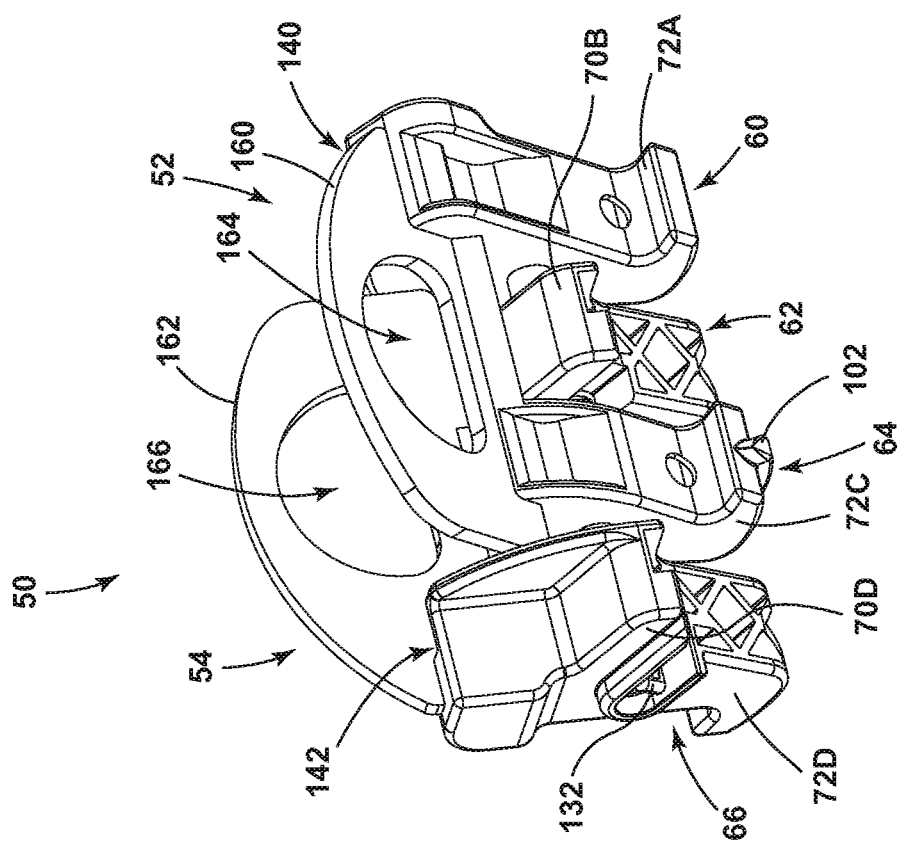
FIG. 7A is a perspective view of an embodiment of a support assembly according to teachings of the present disclosure.

With embodiments, such as generally illustrated in FIGS. 7A and 7B, the first support member 52 and/or the second support member 54 may include a rod latch 130, 132. The first support member 52 may include a first rod latch 130, and/or the second support member 54 may include a second rod latch 132. The first rod latch 130 may be disposed at a first longitudinal end 134 of the first support member 52 and may extend in a first longitudinal direction. The second rod latch 132 may be disposed at a second longitudinal end 136 of the second support member 54 and may extend in a second, opposite longitudinal direction. The rod latches 130, 132 may be configured to engage a first end 82 and a second end 84 of the rod 80, respectively, and/or an outer surface of the rod 80. The rod latches 130, 132 may contact/engage the first end 82 and/or the second end 84 of the rod 80 to limit and/or restrict longitudinal movement of the first support member 52 and the second support member 54 relative to the rod 80, such as to retain the first support member 52 and the second support member 54 in the second position.

In embodiments, the first support member 52 may include a first slot 140 and/or the second support member 54 may include a second slot 142. The first slot 140 may extend in a first axial direction and the second slot 142 may extend in a second, opposite axial direction. The first slot 140 may at least partially receive the support portion 90B of the second support member 54, and/or the second slot 142 may at least partially receive the support portion 90A of the first support member 52. For example and without limitation, if the first support member 52 and/or the second support member rotate such that the top/handle portions 160, 162 are substantially parallel and/or adjacent to each other (and the contact members 60, 62, 64, 68 engage the track 30), the first support member 52 may be moved along the rod 80 into the second slot 142 and/or the second support member 54 may be moved along the rod into the first slot 140 (e.g., into the second position), which may restrict relative rotational movement between the first support member and the second support member. When the support members 52, 54 are disposed sufficiently/fully in the slots 140, 142, the rod latches 130, 132 may (e.g., automatically) engage the ends 82, 84 of the rod 80 to restrict axial/longitudinal movement of the support members 52, 54. Restricting axial movement of the support members 52, 54 may maintain engagement of the second support member 54 with the first slot 140, and/or the first support member 52 with the second slot 142 (e.g., the first support member 52 and the second support member 54 may be retained in the second position). The rod latches 130, 132 may be released from the ends 82, 84 (e.g., by a user), which may permit the first support member 52 and/or the second support member 54 to move longitudinally out of the first slot 140 and the second slot 142, which may then allow the first support member 52 and the second support member 54 to rotate relative to each other and for the contact members 60, 62, 64, 66 to rotate out of engagement with the track 30. The support members 52, 54 may, for example and without limitation, include rod latches 130, 132 and slots 104, 142 instead of latches 110, 112 and recesses 114, 116.

With embodiments, such as generally illustrated in FIGS. 6A, 6B, and 6C, the first support member 52 and/or the second support member 54 may include a first position and/or a second position. In the first position (see, e.g., FIG. 6A), the support assembly 50 may not be engaged with the track 30, may move longitudinally along the track 30, and/or may be inserted and/or removed vertically from the track 30. The contact members 60, 62, 64, 66 may be disposed in generally parallel configuration and/or may not be in substantial contact with the inner surface 36 of the outer track 32. When in the first position, gaps 150 may be disposed between the first contact member 60 and the second contact member 62, and/or the third contact member 64 and the fourth contact member 66 (see, e.g., FIG. 4).

In embodiments, the biasing member 120 may bias the first support member 52 and the second support member 54 toward the first position. The biasing member 120 may exert rotational forces on the first support member 52 and/or the second support member 54 such that they are disposed at an angle with respect to each other. For example and without limitation, the angle may be large enough such that the first latch 110 does not longitudinally overlap with the second support member 54, and/or the second latch 112 does not longitudinally overlap with the first support member 52 (see, e.g., FIG. 6A). In the first position, the first latch 110 may not be engaged with the second recess 116, and/or the second latch 112 may not be engaged with the first recess 114. The first support member 52 and/or the second support member 54 may be free to rotate about the rod axis with and/or against the biasing member 120. The first support member 52 and the second support member 54 may be free to move longitudinally along the rod 80 when in the first position.

In embodiments, the first support member 52 and/or the second support member 54 may move between a first position and a second position. When moving between the first position and the second position, the first support member 52 and/or second support member 54 may rotate about the rod 80 and/or may translate along the rod 80, such as toward each other. For example and without limitation, moving from the first position to the second position may include the first support member 52 and/or the second support member 54 rotating such that top/handle portions 160, 162 of the support members 52, 54 are substantially parallel with each other. Then, the first support member 52 and the second support member 54 may move towards each other (e.g., axially) such as to partially engage each other (e.g., such that some of the first support member 52 is disposed between the second support member 54 and the second latch 112, and some of the second support member 54 is disposed between the first support member 52 and the first latch 110) until the second position is reached. In the second position, the first latch 110 may engage the second recess 116 of the second support member and/or the second latch match engage the first recess 114.

A biasing force of the biasing member 120 may bias the first support member 52 and/or the second support member 54 toward the first position (e.g., the open/removal position), which may include biasing the latches 110, 112 into the recesses 114, 116, respectively. For example, the biasing member 120 may simultaneously bias the first support member 52 and the second support member 54 toward the first position and bias the latches 110, 112 into the recesses 114, 116 to facilitate maintaining the first support member 52 and the second support member 54 in the second position (e.g., engaged with the track 30).

With embodiments, such as generally illustrated in FIGS. 6B and 6C, the first support member 52 and/or the second support member 54 may include a second/clamped position. When the support members 52, 54 are in the second position, the support members 52, 54 may be engaged with and/or clamped on the track 30, which may restrict and/or prevent longitudinal movement of the support assembly 50 relative to the track 30. Additionally or alternatively, vertical movement of the support assembly 50 (e.g., insertion into the track 30 and/or removal from the track 30) may be restricted and/or prevented. In the second position, the contact members 60, 62, 64, 66 may be in contact with the outer track 32 and/or the inner track 34. The upper portions 70A, 70B, 70C, 70D of the contact members 60, 62, 64, 66 may be in contact with the outer surface 38 of the outer track 32, and/or the lower portions 72A, 72B, 72C, 72D of the contact members 60, 62, 64, 66 may be in contact with the inner surface 36 of the outer track 32. When the first support member 52 and/or the second support member 54 are in the second position, there may be a gap 150 between the second contact member 62 and the third contact member 64 (see, e.g., FIG. 6C). The first contact member 60 may be in contact with the second contact member 62, and/or the third contact member 64 may be in contact with the fourth contact member 66.

In embodiments, the first support member 52 and/or second support member 54 may apply a clamping force on the outer track 32. The contact members 60, 62, 64, 66 may be rotated into engagement with the track 30, such as from the first position to the second position. The lower portions 72A, 72B, 72C, 72D may limit upward movement of the support assembly 50 relative to the track 30, and/or the upper portions 70A, 70B, 70C, 70D may limit downward movement of the support assembly 50 relative to the track, which may effectively sandwich the outer track 32. For example and without limitation, the lower portions 72A, 72C of the first contact member 60 and the third contact member 64 may cooperate with the upper portions 70B, 70D of the second contact member 62 and the fourth contact member 66 to clamp the first side 40 of the outer track 32, and/or the upper portions 70A, 70C of the first contact member 60 and the third contact member 64 may cooperate with the lower portions 72B, 72D of the second contact member 62 and the fourth contact member 66 to clamp the second side 42 of the outer track 32. The clamping force of the contact members 60, 62, 64, 66 on the track 30 may be large enough to prevent longitudinal movement of the support assemble 50 along the track 30. A resulting frictional force from the clamping force may limit longitudinal movement of the support members 52, 54. The upper portions 70A, 70B, 70C, 70D of the contact members 60, 62, 64, 66 may include a tooth 152 that may improve the clamping force, and/or the frictional force. When the first support member 52 and/or the second support member 54 are in the second position, the fins 100, 102 may engage the inner track 34 such as to limit longitudinal movement of the support assembly 50 along the track 30. The first fin 100 and/or the second fin 102 may be disposed within the apertures 34A of the inner track 34.

With embodiments, once the first support member 52 and the second support member 54 are in the second position, the first support member 52 and the second support member 54 may slide together such that first support member 52 is disposed partially in the second latch 112, the second latch 112 is engaged with the first recess 114, the second support member 54 is disposed partially in the first latch 110, and/or the first latch 110 is engaged with the second recess 116. Engagement of the latches 110, 112 with the recesses 114, 116 may limit longitudinal movement of the first support member 52 and/or the second support member 54, such as to move to from the second position to the first position. Additionally or alternatively, engagement of the latches 110, 112 with the recesses 114, 116 may restrict relative rotational movement between the first support member 52 and the second support member 54, which may maintain the first support member 52 and the second support member 54 in the second position (and clamped with the outer track 32).

With embodiments that include rod latches 130, 132, when the support members 52, 54 are in the second position, the rod latches 130, 132 may contact the end 82, 84 of the rod 80 (e.g., instead of only an outer radial surface 86 of the rod 80) and limit longitudinal movement of the support members 52, 54 along the rod 80. Limiting longitudinal movement of the first support member 52 and the second support member 54 may maintain the engagement of the first support member 52 with the second slot 142 and/or the second support member 54 with the first slot 140.

In embodiments, such as generally illustrated in FIGS. 3, 4, 6A, 6B, and 6C, the support portions 90A, 90B may include top portions 160, 162 that may be configured as handles and/or connections portions (e.g., tie-downs). The support portion 90A of the first support member 52 may include a first top portion 160 and/or the support portion 90B of the second support member 54 may include a second top portion 162. The first top portion 160 and/or the second top portion 162 may be disposed at a top of the first support member 52 and/or the second support member 54. The first top portion 160 may include a first aperture 164, and/or the second top portion 162 may include a second aperture 166. The apertures 164, 166 may include one or more of a variety of different sizes, shapes, and/or configurations. For example and without limitation, the apertures 164, 166 may be rounded, circular, oval-shaped, and/or rectangular. The first aperture 164 and the second aperture 166 may include the same size and/or shape. When the first support member 52 and the second support member 54 are in the first position, the apertures 164, 166 may not be longitudinally aligned and/or laterally aligned (e.g., the first top portion 160 may not be flush and/or aligned with the second top portion 162, as shown in FIG. 4). When the support members 52, 54 are in the second position, the apertures 164, 166 may be aligned longitudinally and laterally. Such alignment may provide a visual indication that the support member 52, 54 is fully and/or completely in the second position and/or connected to the track 30. With embodiments, the top portions 160, 162 and/or the apertures 164, 166 may be configured to connect to an attachment (e.g., carabiner clip, latching element, cable, etc.). The top portions 160, 162 may be configured to secure cargo to a mounting surface 22, such as a vehicle floor.

With embodiments, the first support member 52 and the second support member 54 may include similar or the same configurations (e.g., the exact same configuration).

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A support assembly for a track, comprising:
a first support member;
a second support member; and
a rod;
wherein the first support member and the second support member are connected via the rod; the first support member and the second support member are configured to slide longitudinally along the rod;
the first support member and the second support member are configured to rotate about the rod;
the first support member and the second support member are configured to selectively engage said track; and
the first support member, the second support member, and the rod are disposed such that in an engaged position of the support assembly, the rod is substantially parallel to a longitudinal direction of said track.

2. The support assembly of claim 1, wherein the first support member includes a first contact member and a third contact member; and the second support member includes a second contact member and a fourth contact member.

3. The support assembly of claim 2, wherein the first contact member is configured to move with the third contact member; the second contact member is configured to move with the fourth contact member; and the first support member and the second support member are biased toward a disengaged position.

4. The support assembly of claim 2, wherein bottom portions of the first contact member and the third contact member are configured to move outward to contact a first side of said track; and
bottom portions of the second contact member and the fourth contact member are configured to move outward to contact a second side of said track.

5. The support assembly of claim 2, wherein the first contact member includes an upper portion and a lower portion;
the upper portion is configured to contact a top surface of a second side of said track; and
the lower portion is configured to contact an inner surface of a first side of said track.

6. The support assembly of claim 2, wherein the second contact member includes a first fin and the third contact member includes a second fin.

7. The support assembly of claim 6, wherein the first fin and the second fin are configured to engage an aperture in said track to limit longitudinal movement of the support assembly.

8. The support assembly of claim 1, wherein the first support member and the second support member are configured to clamp a first side of said track such that a portion of the first side of said track is disposed between a lower portion of the first support member and an upper portion of the second support member in a vertical direction; and
the first support member and the second support member are configured to clamp a second side of said track such that a portion of the second side of said track is disposed between an upper portion of the first support member and a lower portion of the second support member in said vertical direction.

9. The support assembly of claim 1, wherein the first support member includes a first latch and a first aperture; and the second support member includes a second latch and a second aperture.

10. The support assembly of claim 9, wherein in the engaged position, the first latch is engaged with the second aperture and the second latch is engaged with the first aperture; and
the first latch, the second latch, the first aperture, and the second aperture are configured to limit rotation of the first support member and the second support member.

11. The support assembly of claim 1, wherein the first support member includes a first latch;
the second support member includes a second latch;
when the first support member and the second support member are in a disengaged position, the first latch and the second latch are not engaged with ends of the rod; and
in the engaged position, the first latch and the second latch engage ends of the rod to limit longitudinal movement of the first support member and the second support member.

12. A track assembly comprising:
the support assembly of claim 1; and
said track, said track including:
an outer track; and
an inner track disposed at least partially in the outer track.

13. The track assembly of claim 12, wherein an upper portion of a first contact member of the first support member and an upper portion of a second contact member of the second support member are configured to contact respective outer surfaces of the outer track when the support assembly is engaged with the track.

14. The track assembly of claim 13, wherein a lower portion of the first contact member and a lower portion of the second contact member are configured to contact respective inner surfaces of the outer track when the support assembly is engaged with the track.

15. The track assembly of claim 14, wherein the lower portion of the first contact member and the lower portion of the second contact member each include a fin, and the fins are configured to engage the inner track and limit longitudinal movement of the first support member and the second support member relative to the track.

16. The track assembly of claim 12, wherein the first support member and the second support member include corresponding apertures that, when the first support member and the second support member are in a clamped position, are substantially aligned and configured for attaching a connector.

17. The track assembly of claim 12, wherein the first support member and the second support member are configured to move between a first position and a second position; the first support member and the second support member are not engaged with the track in the first position; and the first support member and the second support member are clamped with the track in the second position.

18. A support assembly for a track, comprising:
a first support member;
a second support member; and
a rod;
wherein the first support member and the second support member are connected via the rod; at least one of the first support member and the second support member is configured to move longitudinally along the rod; one or both of the first support member and the second support member are configured to rotate about the rod; the first support member and the second support member are configured to selectively engage said track; the first support member includes a first contact member; the second support member includes a second contact member; and the first contact member and the second contact member are substantially S-shaped.

19. A support assembly for a track, comprising:

a first support member;

a second support member;

a rod; and a biasing member configured to bias the first support member and the second support member toward a disengaged position;

wherein the first support member and the second support member are connected via the rod; at least one of the first support member and the second support member is configured to slide longitudinally along the rod;

one or both of the first support member and the second support member are configured to rotate about the rod;

the first support member and the second support member are configured to selectively engage said track;

the first support member and the second support member are configured to move between a first position and a second position;

removal of the first support member and the second support member from said track is not substantially restricted when the first support member and the second support member are in the first position; and removal of the first support member and the second support member from said track is restricted when the first support member and the second support member are in the second position.

20. The support assembly of claim 19, wherein in an engaged position, top portions of the first support member and the second support member are in contact with each other.

* * * * *